United States Patent Office 3,641,112
Patented Feb. 8, 1972

3,641,112
PROCESS FOR THE PREPARATION OF BIS-(β-HYDROXYALKYL) ESTERS OF AROMATIC DICARBOXYLIC ACIDS
Yataro Ichikawa and Yoshiyuki Yamanaka, Yamaguchiken, Japan, assignors to Teijin Limited, Osaka, Japan
No Drawing. Filed May 26, 1969, Ser. No. 827,963
Claims priority, application Japan, May 30, 1968, 43/37,024
Int. Cl. C07c 69/82
U.S. Cl. 260—475 P
8 Claims

ABSTRACT OF THE DISCLOSURE

It has already been known to prepare bis-(β-hydroxyethyl) terephthalate by the reaction of terephthalic acid with ethylene oxide in the presence of a catalyst comprising an organic amine or its salt. In this invention, the process is carried out in the co-presence of at least one iron compound as a promotor. Thus, a catalyst system of very high activity is provided, and the reaction can be performed at a relatively low temperature with a high conversion of terephthalic acid.

---

This invention relates to a process for the preparation of bis-(β-hydroxyalkyl) esters of aromatic dicarboxylic acids. More particularly, the invention relates to a process for the preparation of bis-(β-hydroxyalkyl) ester, by reacting an aromatic dicarboxylic acid selected from the group consisting of terephthalic, isophthalic, and 2,6-naphthalenedicarboxylic acids with a 1,2-alkylene oxide.

Bis-(β-hydroxyethyl) terephthalate (which will be abbreviated as BHET in this specification) is of extreme commercial importance as an intermediate for polyester fibers or films. Heretofore, BHET has been manufactured on commercial scale by ester-interchange between dimethyl ester of terephthalic acid and ethylene glycol, or by direct esterification of terephthalic acid with ethylene glycol. Whereas, preparation of BHET from terephthalic acid and ethylene oxide has been drawing increasing attention in the recent years.

Likewise, bis-(β-hydroxyalkyl) ester of 2,6-naphthalenedicarboxylic acid are noted as intermediates for making high melting point, fiber-forming polyester of excellent physical properties. Bis-(β-hydroxyalkyl) esters of isophthalic acid also have versatile utilities as intermediates for fiber-, film-, and plastics-forming polyester.

Accordingly, the object of the present invention is to provide a novel and improved process comprising reacting an aromatic dicarboxylic acid selected from the group consisting of terephthalic, isophthalic, and 2,6-naphthalenedicarboxylic acids with a 1,2-alkylene oxide of the formula:

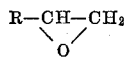

wherein R is a member of the group consisting of hydrogen atom and alkyl group of 1–4 carbons to form a bis-(β-hydroxyalkyl) ester of corresponding aromatic dicarboxylic acid.

Another object of the invention is to provide a novel promotor which can markedly accelerate the rate of forming the bis-(β-hydroxyalkyl) ester of said aromatic dicarboxylic acid in the reaction of said acid with the specified alkylene oxide (hereinafter the reaction will be referred to as the alkylene oxide process), and whereby enables the preparation of object product at a high conversion even at relatively low reaction temperatures.

Other objects and advantages of this invention will become apparent from the following descriptions.

The process for making bis-(β-hydroxyalkyl) ester of aromatic dicarboxylic acid by the means known as alkylene oxide process in which the specified aromatic dicarboxylic acid is reacted with a 1,2-alkylene oxide of the formula

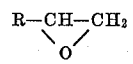

in which the definition of R is same to that given in the foregoing
is already known from numbers of literatures. The known techniques also include the performance of this reaction in the optional presence of reaction medium, using suitable catalyst. It is also known that wide varieties of media may be used for the reaction, such as water, halogenated hydrocarbons, ketones, ethers, cyclic ethers, alcohols, amides, esters, organic cyanides, and aliphatic, alicyclic, and aromatic hydrocarbons. As the catalyst, numerous organic compounds containing nitrogen (N), sulfur (S), phosphorus (P), arsenic (As), or antimony (Sb), such as amines, amine salts, quaternary ammonium salts, quaternary ammonium hydroxides, phosphines, phosphonium salts thioethers, sulfonium salts, arsine, stibine, etc. have been proposed and known to be effective.

Further details of those known reaction media and catalysts will be given hereinbelow, in which the sources proposing their use are given in the parentheses.

Known reaction media (1) Water (British Pat. 623,669, U.S. Pat. 3,052,711, U.S. Pat. 2,932,662);
(2) Halogenated hydrocarbons;
Chlorinated hydrocarbons such as methylene chloride, chloroform, carbon tetrachloride, dichloroethane, trichloroethane, tetrachloroethane, chlorobenzene, dichlorobenzene, etc.
Brominated hydrocarbons such as bromoform, dibromoethane, bromobenzene, etc.
Fluorinated hydrocarbons such as fluorobenzene, α,α',α''-trifluorotoluene, fluoroethane dichloride, etc. (British Pat. 1,029,669)
(3) Ketones;
Actone, methyl ethyl ketone, methyl isopropyl ketone, diethyl ketone, cyclohexanone, methyl isobutyl ketone, 4-methyl-2-pentanone, etc. (U.S. Pat. 3,037,049)
(4) Ethers;
Diethyl ether, diisopropyl ether; dibutyl ether, tetrahydrofuran, dioxane, etc. (U.S. Pats. 3,037,049 and 2,862,957, and British Pat. 1,077,914)
(5) Mono-, di-, and poly-hydric alcohols;
Methanol, ethanol, propanol, isopropanol, butanol, pentanol, ethylene glycol, propylene glycol, bis-(β-hydroxyalkyl) esters of the aromatic carboxylic acids (British Pat. 851,029, U.S. Pat. 2,922,779, British Pat. 1,074,274 and South African Pat. 68/85)
(6) Amides;
N,N-dimethylformamide, N,N-dimethylacetamide, N,N-tetramethyleneformamide, N,N,N',N'-tetramethylurea, hexamethylphosphoramide, N-alkylpyrrolidone, etc. (U.S. Pat. 2,901,505)
(7) Esters;
Alkyl esters of organic carboxylic acids: methyl acetate, ethyl acetate, butyl acetate, methyl propionate, ethyl propionate, butyl propionate, methyl benzoate, ethyl benzoate, methyl phthalate, etc. and cyclic esters such as γ-butyrolactone, ε-caprolactone, etc. (British Pat. 1,029,669)
(8) Organic cyanides;
Acetonitrile, propionitrile, butyronitrile, benzonitrile, succinonitrile, adiponitrile, etc. (British Pat. 1,077,269)
(9) Hydrocarbons;
  (a) Aliphatic hydrocarbons which are liquid under the reaction conditions, and mainly aliphatic hydrocarbons of four or more carbons
    Butane, pentane, hexane, heptane, octane, nonane, decane, etc.
  (b) Alicyclic hydrocarbons
    Cyclopentane, methylcyclopentane, cyclohexane, cyclohexene, methyl-, ethyl-, or isopropylcyclohexane, cyclooctane, cyclooctadiene, cyclododecatrine, etc.
  (c) Aromatic hydrocarbons
    Benzene, toluene, ethylbenzene, isopropylbenzene, o-xylene, m-xylene, p-xylene, diethyl benzene, methyl naphthalene, dimethyl naphthalene, ethyl naphthalene, etc. (U.S. Pat. 3,037,049, British Pat. 1,077,914, U.S. Pat. 2,862,957)

Known catalysts (1) Amines;
  (a) Primary amines, for example, methylamine, ethylamine, isopropylamine, cyclohexylamine, ethanolamine, aniline, etc. (British Pat. 1,083,921)
  (b) Secondary amines, for example, dimethylamine, diethylamine, di-n-butylamine, diethanolamine, N-methylethanolamine, N-methyl-β-cyanoethylamine, piperidine, morpholine, diphenylamine, N-ethyl-m-toluidine, etc. (British Pat. 1,083,921)
  (c) Tertiary amines, for example, trimethylamine, triethylamine, tripropylamine, dimethylethanolamine, diethylethanolamine, N-methyl-morpholine, pyridine, picoline, N,N'-dimethylaniline, triethanolamine, tribenzylamine, etc. (British Pats. 1,029,669 and 1,083,921, and U.S. Pat. 3,037,049)
(2) Amine salts;
  Halogenated hydroacid salts, organic carboxylates, inorganic acid salts such as carbonates, perchlorides, nitrates, etc. of the amines as in (1)-(a), (b), and (c) above. (U.S. Pat. 2,910,490, British Pat. 1,083,921.)
(3) Quaternary ammonuim salts;
  Tetramethylammonium - chloride, -bromide, and -iodide; tetraethylammonium-chloride, -bromide, and -iodide; methyl triethylammonium fluoride; trimethyl phenylammonium-chloride and bromide; triethyl benzylammonium chloride, etc. (U.S. Pat. 2,910,490, British Pat. 1,083,921)
(4) Quaternary ammonium hydroxides;
  Tetramethyl ammonium hydroxide tetraethylammonium hydroxide; methyl triethylammonium hydroxide, triethyl benzylammonium hydroxide, trimethyl phenylammonium hydroxide, etc.
(5) Phosphines and phosphonium salts;
  Triphenylphosphine, triethylphosphine, tripropylphosphine, tributylphosphine, diethyl phenylphosphine, triethyl benzylphosphonium bromide, etc. (British Pat. 1,077,914, Dutch Pat. 6601077, British Pat. 1,083,921)
(6) Thioethers and sulfonium salts;
  Diethyl sulfide, di-n-propyl sulfide, di-n-butyl sulfide, divinyl sulfide, diphenyl sulfide, thiodiglycol, methionine, trithioformaldehyde, dibenzyl sulfide, thioglycolic acid, 2-mercaptoethanol, laurylmercaptane (Japanese Official Patent Gazette, Publication No. 24,577/68), diethylmethylsulfonium iodide, trimethylsulfonium iodide, dibenzylmethylsulfonium iodide, di-n-butylbenzylsulfonium chloride, tribenzylsulfonium chloride, trimethylsulfonium formate, tris(β-hydroxyethyl) sulfonium terephthalate, trimethylsulfonium hydroxide (Japanese Official Patent Gazette, Publication No. 26,624/67)
(7) Compounds intramolecularly containing nitrogen and sulfur;
  1,3 - dimethylthiourea, 2 - mercaptobenzothiazole, tetramethylthiuram monosulfide, etc.
(8) Arsine and arsonium salts;
  Triphenylarsine, triethylarsine, etc. (Dutch Pat. 6601077)
(9) Stibine and stibonium salts;
  Triethylstibine, triphenylstibine, etc. (Dutch Pat. 6601077)

Among the foregoing known catalysts, particularly the secondary amines of (1)–(b), tertiary amines of (1)–(c), salts thereof, quaternary ammonium salts of (3), quaternary ammonium hydroxides of (4), phosphines of (5), and thio-ethers of (6) are suitable for use in this invention.

In the present invention, these known catalyst compounds which further contain hydroxyl or carboxyl groups can also be used. Examples of such compounds are glutamic acid, aminocaproic acid alanine, leucine, and aspartic acid.

None of the aforementioned known catalysts exhibits sufficiently high catalytic activity by itself. Consequently, either a long reaction time or high reaction temperature must be employed, or the quantity of catalyst must be increased, in order to obtain the object bis-(β-hydroxyalkyl) esters at high yields, using the known catalyst. However, when the reaction time is prolonged to the extent to satisfactorily raise the yield, the yield per unit time decreases. Whereas, high reaction temperature apts to cause formation of undesirable side products, and renders the purification of object product difficult. Also increased quantity of catalyst often causes coloring of the product, and purification of colored product is very difficult.

It is now discovered that, in the process comprising reacting an aromatic dicarboxylic acid selected from the group consisting of terephthalic, isophthalic, and 2,6-naphthalenedicarboxylic acids, with a 1,2-alkylene oxide of the formula

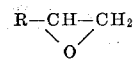

in which R is a member of the group consisting of hydrogen and alkyl group of 1–4 carbons in the presence of catalyst and optional presence of an organic liquid medium, to form a bis-(β-hydroxyalkyl) ester of the specified aromatic dicarboxylic acid, the addition of at least one iron compound to the reaction system as a promoter provides a catalyst system of very high activity, and consequently even through the reaction performed at relatively low temperatures, the object bis-(β-hydroxyalkyl) ester of the aromatic dicarboxylic acid can be obtained at high reaction rate and high conversion.

As the iron compounds to be used as the promoter according to the invention, any iron-containing compound can be used, so far as it is at least partially soluble in the reaction system. The reaction system of the invention initially consists of the aromatic dicarboxylic acid and 1,2-alkylene oxide, of of the said two and an organic liquid as the reaction medium, and with the progress of reaction, the object bis-β-hydroxyalkyl) ester of the aromatic dicarboxylic acid employed is formed in the reaction system. At the initial stage of the reaction normally the aromatic dicarboxylic acid is dispersed in the 1,2-alkylene oxide and/or the organic liquid medium, but depending on the type of said medium, all or part of the aromatic dicarboxylic acid may be dissolved. Also the bis-(β-hydroxyalkyl) ester of the dicarboxylic acid formed may be dissolved or dispersed in the liquid phase of the reaction system, depending on the specified combination of the ester and the organic liquid medium.

And, as already mentioned, the iron compound is limited to no specific group, but any can be used so as it is at least partially soluble in the liquid phase formed in the reaction system. Thus, various organic and inorganic iron compounds can be used. As inorganic iron compounds, halogenides, inorganic acid salts, inorganic complexes of iron may be named, and as organic compounds, complex compounds, carboxylates, alcoholates, etc. of iron may be named. Those may be added to the reaction system as they are, or suitable reactants may be added to the system so as to form the iron compound or compounds therein. In the latter case, the compound may be added to the system in the form of oxide, hydroxide or sulfide of iron. Preferred examples of such iron compounds are as follows:

Inorganic iron compounds

Halogenides;
 ferrous chloride, ferric chloride, ferrous bromide, ferric bromide, etc.
Inorganic acid salts;
 ferrous nitrate, ferric nitrate, ferrous perchloride, ferric perchloride, ferrous carbonate, ferric carbonate, etc.
Inorganic complexes;
 amine complexes of iron, etc.

Organic iron compounds

Complex compounds;
 β-diketone complexes of iron, such as acetylacetone complex, acetoacetic acid ester complex, acetylacetonphenone complex, benzoylaceto complex, c-methylacetylacetone complex, etc.;
 Complexes of iron such as salicylaldehyde complex, α,α'-dipyridyl complex, ortho-phenanthroline complex
Carboxylates;
 Iron salts of lower aliphatic carboxylic acids such as acetic, propionic, and butyric acids, etc.
 Iron salts of higher aliphatic carboxylic acids such as stearic, palmitic, oleic, and lauric acids, etc.
 Iron salts of alicyclic carboxylic acids such as hexahydrobenzoic, and naphthenic acids, etc.
 Iron salts of aromatic carboxylic acids such as benzoic, toluic, isophthalic, terephthalic, and naphthoic acids, etc.
 Iron salts of aminocarboxylic acids such as glutamic, α-aminopropionic, α-aminoisovaleric, α-aminohydrocinnamic, and aspartic acids, etc.
 Iron salts of other cargoxylic acids such as thioglycolic, and hydroxycarboxylic acids
Alcoholates;
 alkoxides such as methoxide, ethoxide, glycoxide, phenoxide, etc.

According to the invention, such iron compound or compounds as named above are used as the promoter, and the reaction of the specified aromatic dicarboxylic acid with the 1,2-alkylene oxide is performed in the presence of known catalyst and also in the optional presence of an organic liquid medium.

As already mentioned, a method of practicing the alkylene oxide process in water as the reaction medium is known, and in that practice, normaly hydroxides or carbonates, etc. of alkali metals are used as the catalyst. However, according to our researches, the iron compounds as above-named hardly exhibit and promoting effect in such reaction in water. Whereas, when the alkylene oxide process with which the invention concerns is practiced in the optional presence of an organic liquid medium, the iron compound or compounds exhibit very conspicuous reaction-promoting effect. Thus, the promoter of this invention can be used concurrently with any catalyst known to be useful in this type of reaction.

While the iron compound shows the promoting effect with any of known catalysts as named before, such as amine, amine salt, quaternary ammonium salt, quaternary ammonium hydroxide, phosphine, phosphonium salt, thioether, sulfonium salt, arsine, stibene, etc., its promoting effect is particularly conspicuous when used with an organic compound catalyst containing nitrogen (N), phosphorus (P), or sulfur (S), such as amine, amine salt, quaternary ammonium salt, quaternary ammonium hydroxide, phosphine, phosphonium salt, thioether, sulfonium salt, etc. The iron compound can be added to the system in such quantities that the iron atom therein should range 0.01–10, preferably 0.1–5, per mol of the known catalyst.

Preferably, the known catalyst and the iron compound used as a promoter in this invention are added to the system in the total amount of 0.01–20% by weight, preferably 0.05–10% by weight, to the aromatic dicarboxylic acid.

When an organic liquid medium is used in the subject process, any known liquid medium including carbon disulfide, carbon tetrachloride, etc. may be employed. Particularly preferred media include aliphatic, alicyclic and aromatic hydrocarbons which are in liquid state in the reaction system; halogenated aliphatic, alicyclic, and aromatic hydrocarbons which are in liquid state in the reaction system; and ketone, ether, ester, and organic cyanide which are in liquid state in the reaction system. Since specific examples of those organic liquid media have been already given, such are omitted herein.

Presence of such organic liquid medium as above-named is preferred, because, since the subject reaction is exothermic, the medium is useful to eliminate the reaction heat, inhibit the formation of side product, and assist smooth progress of the reaction. The organic liquid is preferably used in such an amount sufficient to maintain at least flowable state of the aromatic dicarboxylic acid in the reaction system. There is no critical upper limit to the amount of the liquid medium, but excessive use thereof is economically disadvantageous.

The aromatic dicarboxylic acids used as the starting material in this invention may be prepared by any known method.

The other starting material for practicing the subject process, i.e., 1,2-alkylene oxide of the formula

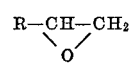

in which the definition of R being as already given, can be directly reacted with the aromatic dicarboxylic acid in the absence of any organic liquid medium, or can be reacted in a suitable organic liquid medium. Normally 1.5–4 mols, preferably 1.8–2.4 mols, of the alkylene oxide is reacted per mol of the aromatic carboxylic acid. When no organic liquid medium is used, greater amount of 1,2-alkylene oxide may be used. In the presence of the liquid medium, the preferred range of 1.8–2.4 mols of 1,2-alkylene oxide per mol of the aromatic dicarboxylic acid is particularly advantageous.

The 1,2-alkylene oxide can be added to the reaction system in the form of a liquid under cooling or an elevated pressure, or as a gas.

The reaction temperature suitable for the subject process is at lowest 50° C., preferably 80° C. and above. While there is no critical upper limit to the reaction temperature, preferably the temperature should be not higher than 180° C., inter alia, not higher than 150° C., in qualitative consideration of the product bis-(β-hydroxyalkyl) esters. The reaction pressure suitably ranges from atmospheric to 50 atmospheres. It is particularly preferred to select such conditions within the above-described temperature and pressure ranges, under which at least a part of the 1,2-alkylene oxide can be maintained at liquid state in the reaction system.

According to the subject process, even when the reaction is conducted at such relatively low temperatures as 50–180° C., particularly 80–150° C., for this type of reaction, the reaction can be progressed at very high rate, and furthermore the starting aromatic dicarboxylic acid can be converted to the corresponding bis-(β-hydroxyalkyl) ester with a high conversion. Again the formation of side product is very little.

The bis-(β-hydroxyalkyl) esters of aromatic dicarboxylic acids obtained by the subject process will be explained, taking the example of BHET. The BHET is subjected to polymerization reaction, as it is obtained from the subject process, or after suitable purification, depending on the purity of starting terephthalic acid. For example, when high purity terephthalic acid for direct polymerization is employed, the resulting BHET is polycondensed as it is, or after relatively simple purification such as washing, extraction, recrystallization, etc. Whereas, when a crude terephthalic acid is employed, the BHET is purified to be eliminated of hydroxyethyl esters of the impurities contained in the starting terephthalic acid, such as p-alkylbenzoic acid, p-carboxybenzaldehyde, and thereafter polycondensed.

The subject process is practicable either continuously or batchwise.

Thus, an accordance with the invention, bis-(β-hydroxyalkyl) esters of terephthalic, isophthalic, and 2,6-naphthalenedicarboxylic acids can be effectively prepared, by the concurrent use of at least one iron compound with known catalyst.

Hereinafter the invention will be explained with reference to working examples, in which parts are by weight unless otherwise specified.

EXAMPLE 1

A stainless steel, agitation-type autoclave was charged with 83 parts of terephthalic acid, 200 parts of benzene, 44 parts of ethylene oxide, 0.50 part of triethylamine, and iron (III) acetylacetonate of the amount varied for each run as indicated in Table 1. After nitrogen-substitution of the inside atmosphere, the autoclave was immersed in an oil bath which was pre-heated to 120° C., to cause the reaction of its content for 15 minutes.

Then the autoclave was cooled and reaction product was withdrawn and filtered. Thus obtained crude BHET was separated, and dried at reduced pressure. Conversion of each run was calculated from the acid value of the resulting crude BHET, with the result as given in Table 1 below.

For comparison, result of similar experiment using triethylamine alone as the catalyst is also given in the Table 1.

TABLE 1

| Catalyst system | | | |
|---|---|---|---|
| Triethylamine (part) | Iron (III) acetylacetonate (part) | Atomic ratio of Fe per mol of amine | Conversion (percent) |
| 0.50 | 0 | 0 | 4.8 |
| 0.50 | 0.45 | 0.25 | 38.7 |
| 0.50 | 0.90 | 0.5 | 40.5 |
| 0.50 | 1.80 | 1.0 | 65.9 |
| 0.50 | 2.70 | 1.5 | 73.4 |
| 0.50 | 3.60 | 2.0 | 69.7 |

Control

A stainless steel autoclave was charged with 83 parts of terephthalic acid, 200 parts of benzene, 44 parts of ethylene oxide, and 1.80 parts of iron (III) acetylacetonate, and its inside atmosphere was nitrogen-substituted. The autoclave was then immersed in an oil bath which was pre-heated to 120° C., to cause the reaction of its content for 60 minutes.

After cooling the autoclave, the reaction product was withdrawn and treated similarly to Example 1. The conversion calculated in the similar manner was 0.4%.

EXAMPLE 2

A stainless steel, agitation-type autoclave was charged with 83 parts of terephthalic acid, 200 parts of benzene, 44 parts of ethylene oxide, 0.50 part of triethylamine, and each predetermined amount (atomic ratio of Fe per mole of amine=1.0) of the promotor specified in Table 2. After nitrogen-substitution of its inside atmosphere, the autoclave was immersed in an oil bath which was pre-heated to 120° C., and the content was reacted for 60 minutes.

Thereafter the autoclave was cooled and the reaction product was withdrawn to be treated similarly to Example 1. The conversions calculated in the similar manner to Example 1 are also given in Table 2.

For comparison, the result of similar experiment using triethylamine alone as the catalyst is indicated in the same table.

TABLE 2

| Catalyst system | | | | Conversion (percent) |
|---|---|---|---|---|
| Catalyst | Part | Promotor | Part | |
| Triethylamine | 0.50 | | | 19.2 |
| Do | 0.50 | Iron (III) acetylacetonate | 1.80 | 99.0 |
| Do | 0.50 | Iron (III) benzoate | 2.10 | 93.5 |
| Do | 0.50 | Iron (III) butoxide | 1.38 | 93.4 |
| Do | 0.50 | Iron (III) chloride | 0.99 | 92.5 |
| Do | 0.50 | Iron (II) chloride | 0.81 | 34.9 |

EXAMPLE 3

A stainless steel, agitation-type autoclave was charged with 83 parts of terephthalic acid, 200 parts of benzene, 44 parts of ethylene oxide, 1.80 parts of iron (III) acetylacetonate (atomic ratio of Fe per mol of amine=1.0) and the specified catalyst of the amount indicated in Table 3. After nitrogen-substitution of the inside atmosphere, the autoclave was immersed in an oil bath which was pre-heated to 120° C. The content of the autoclave was reacted for 60 minutes, and then withdrawn when sufficiently cooled. The reaction product of each run was treated similarly to Example 1, and its conversion was calculated, with the result as given in Table 3.

For comparison, the results of control runs in which the addition of promotor was omitted are also given in the same table.

TABLE 3

| Catalyst system | | | | Conversion (percent) |
|---|---|---|---|---|
| Catalyst | Part | Promotor | Part | |
| Cyclohexylamine | 0.50 | | | 0.5 |
| Do | 0.50 | Iron (III) acetylacetonate | 1.80 | 91.9 |
| Diethylamine | 0.37 | | | 6.0 |
| Do | 0.37 | Iron (III) acetylacetonate | 1.80 | 96.4 |
| Triethylamine | 0.50 | | | 19.2 |
| Do | 0.50 | Iron (III) acetylacetonate | 1.80 | 99.0 |
| Triethylbenzylammonium chloride | 1.14 | | | 46.0 |
| Do | 1.14 | Iron (III) acetylacetonate | 1.80 | 92.0 |
| 1,3-dimethylthiourea | 0.52 | | | 10.8 |
| Do | 0.52 | Iron (III) acetylacetonate | 1.80 | 92.0 |
| Triphenylphosphine | 1.31 | | | 37.5 |
| Do | 1.31 | Iron (III) acetylacetonate | 1.80 | 94.0 |
| Diethyl sulfide | 0.45 | | | 2.8 |
| Do | 0.45 | Iron (III) acetylacetonate | 1.80 | 48.1 |
| Triphenylarsine | 1.69 | | | 2.1 |
| Do | 1.69 | Iron (III) acetylacetonate | 1.80 | 13.5 |
| Triethylstibine | 1.05 | | | 3.6 |
| Do | 1.05 | Iron (III) acetylacetonate | 1.80 | 12.8 |

EXAMPLE 4

A stainless steel, agitation-type autoclave was charged with 83 parts of terephthalic acid, 200 parts of a reaction medium specified in Table 4, 44 parts of ethylene oxide, 0.50 part of triethylamine and 1.80 parts of iron (III) acetylacetonate (the atomic ratio of Fe per mol of amine=1.0), and its inside atmosphere was nitrogen-substituted. Then the system was immersed in an oil bath which was pre-heated to 120° C. and reacted for 60 minutes.

After cooling, the reaction product was withdrawn, and the reaction medium was distilled off under a reduced pressure to dry the product. The acid value of thus obtained crude BHET in each run was measured, and from which the conversion was calculated, with the result as given in Table 4.

For comparison, the results of control runs in which triethylamine alone was used as the catalyst are given in the same table.

TABLE 4

| Catalyst component | | | |
|---|---|---|---|
| Triethyl-amine (part) | Iron (III) acetyl-acetonate (part) | Reaction medium | Conversion (percent) |
| 0.50 | 0 | Benzene | 19.2 |
| 0.50 | 1.80 | do | 99.0 |
| 0.50 | 0 | n-Heptane | 8.5 |
| 0.50 | 1.80 | do | 97.3 |
| 0.50 | 0 | Acetone | 38.6 |
| 0.50 | 1.80 | do | 79.0 |
| 0.50 | 0 | Methanol | 29.9 |
| 0.50 | 1.80 | do | 36.5 |
| 0.50 | 0 | Acetonitrile | 44.5 |
| 0.50 | 1.80 | do | 70.3 |
| 0.50 | 0 | Tetrahydrofuran | 44.2 |
| 0.50 | 1.80 | do | 91.8 |
| 0.50 | 0 | Chloroform | 19.1 |
| 0.50 | 1.80 | do | 53.3 |
| 0.50 | 0 | 1,2-dimethoxyethane | 24.7 |
| 0.50 | 1.80 | do | 97.2 |
| 0.50 | 0 | Water | 4.0 |
| 0.50 | 1.80 | do | 18.9 |
| 0.50 | 0 | Ethyl acetate | 22.3 |
| 0.50 | 1.80 | do | 96.6 |

EXAMPLE 5

A stainless steel, agitation-type autoclave was charged with 83 parts of terephthalic acid, 200 parts of benzene, 44 parts of ethylene oxide, and triethylamine and iron (III) acetylacetonate of the amounts varied for each run as indicated in Table 5 (the atomic ratio of Fe per mol of amine=1.0). After nitrogen-substitution of the inside atmosphere, the autoclave was immersed in an oil bath which was pre-heated to 120° C., and the system was reacted for 60 minutes.

After cooling, the reaction product was withdrawn, and treated similarly to Example 1. Thus calculated conversions are also given in Table 5 below.

For comparison, the result of a control run in which 0.50 part of triethylamine alone was used as the catalyst is given in the same table.

TABLE 5

| Catalyst system | | |
|---|---|---|
| Triethyl-amine (part) | Iron (III) acetylace-tonate (part) | Conversion (percent) |
| 0.50 | 0 | 19.2 |
| 0.50 | 1.80 | 99.0 |
| 0.30 | 1.08 | 96.8 |
| 0.15 | 1.54 | 81.8 |
| 0.05 | 0.18 | 37.5 |
| 0.025 | 0.09 | 16.0 |

EXAMPLE 6

A stainless steel, agitation-type autoclave was charged with 83 parts of terephthalic acid, 200 parts of benzene, 44 parts of ethylene oxide, and triethylamine and iron (III) acetylacetonate of the amounts varied for each run as indicated in Table 6 (the atomic ratio of Fe per mol of amine=1.0). After nitrogen-substitution of the inside atmosphere, the autoclave was immersed in an oil bath which was pre-heated to 120° C. to cause reaction of the system for 10 minutes.

Then the autoclave was cooled and the reaction product was withdrawn, which was treated similarly to Example 1. Thus calculated conversions are given in Table 6 below.

TABLE 6

| Catalyst system | | |
|---|---|---|
| Triethyl-amine (part) | Iron (III) acetylacet-onate (part) | Conversion (percent) |
| 0.50 | 1.80 | 53.9 |
| 1.50 | 5.40 | 87.4 |
| 3.00 | 10.80 | 96.7 |
| 5.00 | 18.00 | 98.0 |

EXAMPLE 7

A stainless steel, agitation-type autoclave was charged with 83 parts of terephthalic acid, 88 parts of ethylene oxide, 0.50 part of triethylamine, and 1.80 parts of iron (III) acetylacetonate (the atomic ratio of Fe per mol of amine=1.0), and its inside atmosphere was nitrogen-substituted. The nitrogen supply was continued until the inside pressure reached 20 kg./cm.$^2$ G., and then the autoclave was immersed in an oil bath which was pre-heated to 80° C. to cause reaction of the system for 60 minutes.

After cooling, the reaction product was withdrawn and dried under a reduced pressure. The conversion was calculated from the acid value measured of thus obtained crude BHET, which was 74.2%.

For comparison, the experiment was repeated using triethylamine alone as the catalyst, the resulting conversion being 2.0%.

EXAMPLE 8

A stainless steel, agitation-type autoclave was charged with 83 parts of terephthalic acid, 200 parts of benzene, 44 parts of ethylene oxide, 0.05 part of triethylamine and 0.18 part of iron (III) acetylacetonate (the atomic ratio of Fe per mol of amine=1.0). After nitrogen-substitution of the inside atmosphere, the autoclave was immersed in an oil bath which was pre-heated to 150° C., to cause reaction of the system for 30 minutes.

The autoclave was then cooled, and the reaction product was withdrawn to be treated similarly to Example 1. The resulting conversion was 50.4%.

For comparison, the experiment was repeated except that triethylamine alone was used as the catalyst. The resulting conversioin was 15.4%.

EXAMPLE 9

A stainless steel autoclave was charged with 83 parts of 2,6-naphthalenedicarboxylic acid, 200 parts of benzene, 34 parts of ethylene oxide, and a catalyst system of the type and amount specified in Table 7. After nitrogen-substitution of the inside atmosphere, the autoclave was immersed in an oil bath which was pre-heated to 140° C. to cause reaction of the system for 60 minutes.

Cooling the autoclave, the reaction product was withdrawn and treated similarly to Example 1. The conversion of each run was as given in Table 7.

For comparison, the results of the control runs in which the use of promoter was omitted are also given in the same table.

TABLE 7

| Catalyst | Part | Promotor | Part | Atomic ratio of Fe per mol of catalyst | Conversion (percent) |
|---|---|---|---|---|---|
| Triethylamine | 0.50 | | | 0 | 1.6 |
| Do | 0.50 | Iron (III) benzoate | 2.10 | 1.0 | 84.5 |
| Do | 0.50 | Iron (III) acetylacetonate | 1.80 | 1.0 | 89.2 |
| Triphenylphosphine | 1.31 | | | 0 | 4.8 |
| Do | 1.31 | Iron (III) benzoate | 2.10 | 1.0 | 77.9 |
| Do | 1.31 | Iron (III) acetylacetonate | 1.80 | 1.0 | 81.3 |

EXAMPLE 10

A stainless steel autoclave was charged with 83 parts of isophthalic acid, 200 parts of benzene, 44 parts of ethylene oxide, and each predetermined amount of the catalyst system as specified in Table 8. After nitrogen-substitution of the inside temperature, the autoclave was immersed in an oil bath which was pre-heated to 110° C. to cause reaction of the system for 60 minutes.

Cooling the autoclave, the reaction product was withdrawn and treated similarly to Example 1. The conversion of each run calculated similarly to the foregoing examples was as given in Table 8.

For comparison, results of repeating the experiments with omission of the promoter are also given in the same table.

TABLE 8

| Catalyst | Part | Promotor | Part | Atomic ratio of Fe per mol of catalyst | Conversion (percent) |
|---|---|---|---|---|---|
| Triethylamine | 0.50 | | | 0 | 13.2 |
| Do | 0.50 | Iron (III) benzoate | 2.10 | 1.0 | 92.2 |
| Do | 0.50 | Iron (III) acetylacetonate | 1.80 | 1.0 | 95.4 |
| Triphenylphosphine | 1.31 | | | 0 | 21.4 |
| Do | 1.31 | Iron (III) benzoate | 2.10 | 1.0 | 91.6 |
| Do | 1.31 | Iron (III) acetylacetonate | 1.80 | 1.0 | 94.3 |

EXAMPLE 11

A stainless steel autoclave was charged with 83 parts of terephthalic acid, 200 parts of benzene, 44 parts of ethylene oxide, each predetermined amount of the catalyst specified in Table 9, and 2.00 parts of iron naphthenate (the atomic ratio of Fe per mol of catalyst=0.5). After nitrogen-substitution of inside atmosphere, the autoclave was immersed in an oil bath which was pre-heated to 120° C. to cause reaction of the system for 60 minutes.

Then the autoclave was cooled, and the reaction product as withdrawn was treated similarly to Example 1. Thus calculated conversion of each run was as indicated in Table 9 below.

For comparison, the results of the control runs in which the use of promoter was omitted are also given in the same table.

TABLE 9

| Catalyst | Part | Promotor | Part | Conversion (percent) |
|---|---|---|---|---|
| Triethylbenzyl-phosphonium bromide | 1.45 | | | 41.5 |
| Do | 1.45 | Iron naphthenate | 2.00 | 95.2 |
| Triethyl-sulfonium iodide | 1.23 | | | 11.9 |
| Do | 1.23 | Iron naphtehnate | 2.00 | 56.8 |

EXAMPLE 12

A stainless steel autoclave was charged with 83 parts of terephthalic acid, 200 parts of 1,2-dimethoxyethane, 44 parts of ethylene oxide, 0.50 part of triethylamine, and a predetermined amount of a promotor specified in Table 10 (the atomic ratio of Fe per mol of amine=1.0). After nitrogen-substitution of inside atmosphere, the autoclave was immersed in an oil bath which was pre-heated to 120° C. to cause reaction of the system for 60 minutes.

Cooling the autoclave, the reaction product was withdrawn, and treated similarly to Example 4. Thus calculated conversion of each run was as shown in Table 10.

For comparison, the result of a control run in which triethylamine alone was used as the catalyst is also given in the same table.

| Catalyst | Part | Promotor | Part | Conversion (percent) |
|---|---|---|---|---|
| Triethylamine | 0.50 | | | 24.7 |
| Do | 0.50 | Iron (III) salicylate | 1.77 | 91.8 |
| Do | 0.50 | Iron (II) succinate | 1.80 | 89.6 |
| Do | 0.50 | Iron (II) glutamate | 1.74 | 90.9 |
| Do | 0.50 | Iron (II) butyrate | 1.17 | 87.5 |
| Do | 0.50 | Iron (III) nitrate | 1.75 | 85.6 |
| Do | 0.50 | Iron (II) perchloride | 1.81 | 80.3 |
| Do | 0.50 | Iron (III) bromide | 1.48 | 94.5 |
| Do | 0.50 | Hexamine iron (III) chloride | 1.15 | 81.4 |

EXAMPLE 13

A stainless steel autoclave was charged with 83 parts of terephthalic acid, 200 parts of n-heptane, 44 parts of ethylene oxide, 0.37 part of n-butylamine, and 3.10 part of iron (II) stearate (the atomic ratio of Fe per mol of amine=1.0). After nitrogen-substitution of inside atmosphere, the autoclave was immersed in an oil bath which was pre-heated to 120° C. to cause reaction of the system for 60 minutes.

Cooling the autoclave, the reaction product was withdrawn and treated similarly to Example 1. Thus calculated conversion was 94.6%.

For comparison, the experiment was repeated using n-butylamine alone as the catalyst, with the resulting conversion of 1.4%.

EXAMPLE 14

A stainless steel autoclave was charged with 83 parts of terephthalic acid, 200 parts of toluene, 44 parts of ethylene oxide, 0.51 part of di-n-propylamine, and 4.00 parts of iron naphthenate (the atomic ratio of Fe per mol of amine=1.0). After nitrogen-substitution of inside atmosphere, the autoclave was immersed in an oil bath which was pre-heated to 120° C. to cause reaction of the system for 60 minutes.

Cooling the autoclave, the reaction product was withdrawn, treated similarly to Example 1, and the conversion of terephthalic acid to bis-(β-hydroxyethyl) terephthalate was calculated from acid value of the crude BHET, which was 96.7%.

For comparison, the conversion in the control run in which di-n-propylamine alone was used as the catalyst was 5.6%.

EXAMPLE 15

A stainless steel autoclave was charged with 83 parts of terephthalic acid, 200 parts of toluene, 44 parts of ethylene oxide, 1.23 part of triphenylamine, and 1.73 parts of iron (III) phenoxide (the atomic ratio of Fe per mol of amine=1.0). After nitrogen-substitution of inside atmosphere, the autoclave was immersed in an oil bath which was pre-heated to 120° C. to cause reaction of the system for 60 minutes.

Cooling the autoclave, the reaction product was withdrawn, and treated similarly to Example 1. The conversion was 73.2%.

Whereas, the conversion of the control run in which triphenylamine alone was used as the catalyst was 10.3%.

EXAMPLE 16

A stainless steel autoclave was charged with 83 parts of terephthalic acid, 200 parts of benzene, 60 parts of propylene oxide, 0.50 part of triethylamine and 1.80 parts of iron (III) acetylacetonate (the atomic ratio of Fe per mol of amine=1.0). After nitrogen-substitution of the inside atmosphere, the autoclave was immersed in an oil bath which was pre-heated to 120° C. to cause reaction of the system for 60 minutes.

Cooling the autoclave, the reaction product was withdrawn and treated similarly to Example 1. The conversion calculated from the acid value of resulting crude BHET was 89.6%.

Whereas, the conversion in the control run wherein triethylamine alone was used as the catalyst was 14.3%.

EXAMPLE 17

A stainless steel autoclave was charged with 83 parts of terephthalic acid, 200 parts of benzene, 65 parts of butylene oxide, 0.50 part of triethylamine, and 1.80 parts of iron (III) acetylacetonate (the atomic ratio of Fe per mol of amine=1.0). After nitrogen-substitution of the inside atmosphere, the autoclave was immersed in an oil bath which was pre-heated to 120° C. to cause reaction of the system for 60 minutes.

Cooling the autoclave, the reaction product was withdrawn and treated similarly to Example 1. The conversion was 72.4%.

For comparison, the above experiment was repeated using triethylamine alone as the catalyst. The conversion was 9.6%.

We claim:
1. A process for preparing a bis-(β-hydroxyalkyl) ester of an aromatic dicarboxylic acid selected from the group consisting of terephthalic acid, isophthalic acid and 2,6-naphthalene dicarboxylic acid, which comprises reacting said aromatic dicarboxylic acid with a 1,2- alkylene oxide of the formula

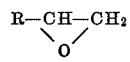

wherein R is a member selected from the group consisting of a hydrogen atom and an alkyl group of 1–4 carbon atoms,
in the presence of
a catalyst selected from the group consisting of amines, amine salts, quaternary ammonium salts, quaternary ammonium hydroxides, phosphines, phosphonium salts, thioethers, sulfonium salts, arsines, arsonium salts, stibines, stibonium salts, 1,3-dimethylthiourea, 2 - mercaptobenzothiazole, and tetramethylthiuram monosulfide;
in the presence or absence of a liquid medium selected from the group consisting of water, halogenated hydrocarbons, ketones, ethers, alcohols, amides, organic esters, organic cyanides and hydrocarbons;
and, as a promoter, at least one iron compound which is at least partially soluble in the reaction medium.

2. The process of claim 1, wherein said catalyst is at least partially soluble in the reaction system comprising said aromatic dicarboxylic acid and 1,2-alkylene oxide.

3. The process of claim 1, wherein said iron compound is selected from the group consisting of complex compounds, organic carboxylates, alkoxides and halogenides of iron.

4. The process of claim 1 wherein said iron compound is present in a quantity of 0.01–10 iron atoms per mol of said catalyst.

5. The process of claim 1, wherein the reaction is performed at a temperature[s] of from 50–180° C. and at a pressure of from atmospheric to 50 atmospheres.

6. The process of claim 1, wherein the reaction temperature and pressure are so determined that the alkylene oxide in the reaction system is maintained in at least a partially liquid state.

7. The process of claim 1, wherein the reaction is performed in the presence of said liquid medium.

8. The process of claim 7, wherein said aromatic dicarboxylic acid is reacted with said 1,2-alkylene oxide at a ratio of 1.5–4 mols of the latter per mol of said aromatic dicarboxylic acid.

References Cited

UNITED STATES PATENTS 3,459,788   8/1969   Enoki et al. _____ 260—475

LORRAINE A. WEINBERGER, Primary Examiner

E. J. SKELLY, Assistant Examiner